United States Patent
Reitz et al.

(10) Patent No.: US 7,423,512 B1
(45) Date of Patent: *Sep. 9, 2008

(54) ZINC OXIDE PARTICLES

(75) Inventors: Hariklia Dris Reitz, Santa Clara, CA (US); Sujeet Kumar, Fremont, CA (US); Xiangxin Bi, San Ramon, CA (US); Nobuyuki Kambe, Menlo Park, CA (US)

(73) Assignee: NanoGram Corporation, Milpitas, CA (US)

( * ) Notice: Subject to any disclaimer, the term of this patent is extended or adjusted under 35 U.S.C. 154(b) by 1707 days.

This patent is subject to a terminal disclaimer.

(21) Appl. No.: 09/266,202

(22) Filed: Mar. 10, 1999

Related U.S. Application Data

(63) Continuation-in-part of application No. 08/962,362, filed on Oct. 31, 1997, now Pat. No. 7,132,783.

(51) Int. Cl.
*H01C 7/10* (2006.01)

(52) U.S. Cl. .................. 338/21; 313/496; 428/402; 252/301.4 R; 423/622

(58) Field of Classification Search .................. 338/21, 338/20, 35, 25; 252/301.6, 519.51, 301.4 R; 313/485, 467, 496, 503; 428/402, 403, 689, 428/700, 701, 702, 357, 399; 423/622, 623
See application file for complete search history.

(56) References Cited

U.S. PATENT DOCUMENTS

| | | | |
|---|---|---|---|
| 2,603,554 A | 7/1952 | Calbeck | 23/147 |
| 2,610,154 A | 9/1952 | Brown, Jr. | 252/301.6 |
| 2,854,413 A | 9/1958 | Geary | 252/301.6 |
| 2,863,084 A | 12/1958 | Arnott et al. | 315/1 |
| 2,898,191 A | 8/1959 | Conn et al. | 23/147 |
| 2,968,627 A | 1/1961 | Wachtel | 252/301.6 |
| 3,040,202 A | 6/1962 | Lehmann | 313/108 |
| 3,131,025 A | 4/1964 | Carnall, Jr. et al. | 23/135 |
| 3,260,879 A | 7/1966 | Feuer | 313/108 |
| 3,406,228 A | 10/1968 | Hardy et al. | 264/0.5 |
| 3,691,088 A | 9/1972 | Pelton | 252/301.6 |
| 3,984,586 A | 10/1976 | Kawarada et al. | 427/64 |
| 4,116,864 A | 9/1978 | Kagami et al. | 252/301.6 |

(Continued)

FOREIGN PATENT DOCUMENTS

JP 02309592 12/1990

(Continued)

OTHER PUBLICATIONS

"Observation of Melting in 30A Diameter CdS Nanocrystals" by, Goldstein et al., Mat. Res. Cos, Symp. Proc. vol. 206, (1991)e pp. 271-274.

(Continued)

*Primary Examiner*—K. Richard Lee
(74) *Attorney, Agent, or Firm*—Dardi & Associates PLLC; Peter S. Dardi

(57) ABSTRACT

A collection of zinc oxide nanoparticles have been produced by laser pyrolysis. The zinc oxide nanoparticles have average particle diameters of less than about 95 nm and a very narrow particle size distribution. The laser pyrolysis process is characterized by the production of a reactant stream within the reaction chamber, where the reactant stream includes a zinc precursor and other reactants. The zinc precursor can be delivered as an aerosol.

14 Claims, 9 Drawing Sheets

U.S. PATENT DOCUMENTS

| | | | | |
|---|---|---|---|---|
| 4,172,920 | A | | 10/1979 | Kanda et al. ................. 428/403 |
| 4,275,333 | A | | 6/1981 | Kagami et al. .............. 313/495 |
| 4,680,231 | A | | 7/1987 | Yamuaura et al. ........... 428/407 |
| H429 | H | | 2/1988 | Harris et al. ............ 423/561 R |
| 4,808,398 | A | | 2/1989 | Heistand, II ................ 423/622 |
| 4,960,654 | A | | 10/1990 | Yoshinaka et al. .......... 428/614 |
| 5,032,390 | A | * | 7/1991 | Iwaya et al. ................... 424/59 |
| 5,128,063 | A | | 7/1992 | Kamikubo ............... 252/301.5 |
| 5,152,973 | A | | 10/1992 | Spencer .................. 423/419 P |
| 5,167,990 | A | | 12/1992 | Tono et al. .................. 427/215 |
| 5,225,820 | A | | 7/1993 | Clerc ......................... 340/752 |
| 5,250,281 | A | | 10/1993 | Imai et al. ................... 423/623 |
| 5,264,031 | A | | 11/1993 | Palmer et al. ............... 106/401 |
| 5,390,276 | A | | 2/1995 | Tai et al. ..................... 385/146 |
| 5,391,432 | A | * | 2/1995 | Mitchnick et al. ........... 428/357 |
| 5,418,062 | A | | 5/1995 | Budd ......................... 428/403 |
| 5,442,254 | A | * | 8/1995 | Jaskie ........................ 313/485 |
| 5,455,489 | A | * | 10/1995 | Bhargava ................ 315/169.4 |
| 5,460,701 | A | * | 10/1995 | Parker et al. ................ 204/165 |
| 5,498,369 | A | | 3/1996 | Bredol et al. .......... 252/301.65 |
| 5,504,599 | A | | 4/1996 | Okibayashi et al. ........... 359/50 |
| 5,518,812 | A | * | 5/1996 | Mitchnick et al. ........... 428/357 |
| 5,527,519 | A | * | 6/1996 | Miksits et al. ............... 423/622 |
| 5,578,899 | A | | 11/1996 | Haven et al. ................ 313/422 |
| 5,635,154 | A | | 6/1997 | Arai et al. ................... 423/592 |
| 5,637,258 | A | | 6/1997 | Goldburt et al. ...... 252/301.4 R |
| 5,643,496 | A | | 7/1997 | Brese et al. ............ 252/301.65 |
| 5,651,712 | A | | 7/1997 | Potter ......................... 445/24 |
| 5,699,035 | A | * | 12/1997 | Ito et al. ....................... 338/21 |
| 5,770,113 | A | * | 6/1998 | Iga et al. ................. 252/519.51 |
| 6,057,561 | A | | 5/2000 | Kawasaki et al. | 
| 6,099,798 | A | * | 8/2000 | Kambe et al. ................. 422/24 |
| 6,200,680 | B1 | * | 3/2001 | Takeda et al. ............... 428/402 |
| 6,241,819 | B1 | | 6/2001 | Bhargava et al. |
| 7,132,783 | B1 | * | 11/2006 | Kambe et al. ............... 313/467 |
| 2002/0075126 | A1 | * | 6/2002 | Reitz et al. ..................... 338/21 |

FOREIGN PATENT DOCUMENTS

| | | |
|---|---|---|
| JP | 24826/93 | 7/1991 |
| JP | 232924/95 | 2/1994 |
| JP | 134441-96 | 11/1994 |
| JP | 349579-94 | 12/1994 |
| JP | 306485/96 | 5/1995 |
| JP | 256673/98 | 9/1998 |
| WO | WO 98 37165 A | 8/1998 |

OTHER PUBLICATIONS

RCA Electro-Optics Handbook, (1974), p. 14.

"Synthesis and Characterization of Metal-Oxide Nanocrystals prepared by $CO_2$-Laser-Heated Vaporization/Condensation" by Tissue et al., Journal of the SID, vol. 4(3), pp. 213-217 (Oct. 1996).

"Synthesis of Nanoparticles by a Laser Vaporization-Controlled Condensation Technique" by El-Shall et al., SPIE vol. 3123, pp. 98-108 (Jul. 1997).

"The Field Emission display: A New Flat Pane Technology" by, Chris Curtin, Conf. Rec. of the 1991 Intl Display Res. Conf., Oct. 1991, pp. 12-15.

* cited by examiner

ZINC OXIDE PARTICLES

CROSS REFERENCE TO RELATED APPLICATIONS

This application is a continuation-in-part of U.S. patent application Ser. No. 08/962,362, filed on Oct. 31, 1997, now U.S. Pat. No. 7,132,783, incorporated herein by reference.

BACKGROUND OF THE INVENTION

The invention relates to zinc oxide nanoparticles and methods of forming zinc oxide nanoparticles.

Advances in a variety of fields have created a demand for many types of new materials. In particular, a variety of chemical powders can be used in many different processing contexts. Specifically, chemical powders can be used in the production of electronic devices, such as resistors and the like.

In addition, electronic displays often use phosphor material, which emit visible light in response to interaction with electrons. Phosphor materials can be applied to substrates to produce cathode ray tubes, flat panel displays and the like. Improvements in display devices place stringent demands on the phosphor materials, for example, due to decreases in electron velocity and increases in display resolution. Electron velocity is reduced in order to reduce power demands. In particular, flat panel displays generally require phosphors responsive to low velocity electrons.

In addition, a desire for color display requires the use of materials or combination of materials that emit light at different wavelengths at positions in the display that can be selectively excited. A variety of materials have been used as phosphors. In particular, zinc oxide powders have found use as phosphors, either alone or in combination with other materials. In order to obtain materials that emit at desired wavelengths of light, activators have been doped into phosphor material. Alternatively, multiple phosphors can be mixed to obtain the desired emission. Furthermore, the phosphor materials must show sufficient luminescence.

SUMMARY OF THE INVENTION

In a first aspect, the invention pertains to a collection of particles comprising crystalline zinc oxide, the collection of particles having an average diameter less than about 95 nm. The zinc oxide particles can be incorporated into a variety of devices including electronic devices, such as an electrical resistor.

In another aspect, the invention pertains to a method for producing zinc oxide particles. The method includes pyrolyzing a reactant stream comprising a zinc precursor and an oxygen source in a reaction chamber, where the pyrolysis is driven by heat absorbed from a light beam.

In a further aspect, the invention pertains to a method for producing zinc oxide particles, the method including pyrolyzing a reactant stream comprising a zinc precursor aerosol in a reaction chamber, where the pyrolysis is driven by heat absorbed from a light beam.

Moreover, the invention pertains to a reaction system comprising:
  a reaction chamber having an outlet along a reactant path;
  a reactant delivery apparatus that combines reactants within the reaction chamber from a plurality of reactant inlets, such that the combined reactants are directed along the reactant path; and
  a light source that directs a light beam at the combined reactants along the reactant path.

In some embodiments of the reaction system with a plurality of reactant inlets, the reactant delivery apparatus includes:
  an aerosol delivery apparatus that produces an aerosol along the reactant path; and
  a gaseous reactant delivery apparatus that combines a gaseous reactant with the aerosol along the reactant path within the reaction chamber.

The aerosol delivery apparatus can include a conduit connected to a gas supply.

In alternative embodiments of the reaction system, reactant delivery apparatus includes two gas ports oriented to combine two gaseous reactants along the reactant path within the reaction chamber. In other alternative embodiments, the reactant delivery apparatus includes two aerosol delivery apparatuses oriented to combine two aerosol reactants along the reactant path within the reaction chamber.

The reaction system can further include a shielding gas port oriented to direct a shielding gas to limit the spread of the combined reactants along the reactant path. The reactant system can have a reactant delivery apparatus that combines three or more reactants within the reaction chamber along the reactant path from three or more reactant inlets.

In another aspect, the invention features a method of producing chemical powders, the method comprising:
  combining two reactants within a reaction chamber from a plurality of reactant inlets, such that the combined reactants are directed along a reactant path; and
  pyrolyzing the reactants flowing along the reaction path with an intense light source.

DETAILED DESCRIPTION OF THE PREFERRED EMBODIMENTS

Figure 1:
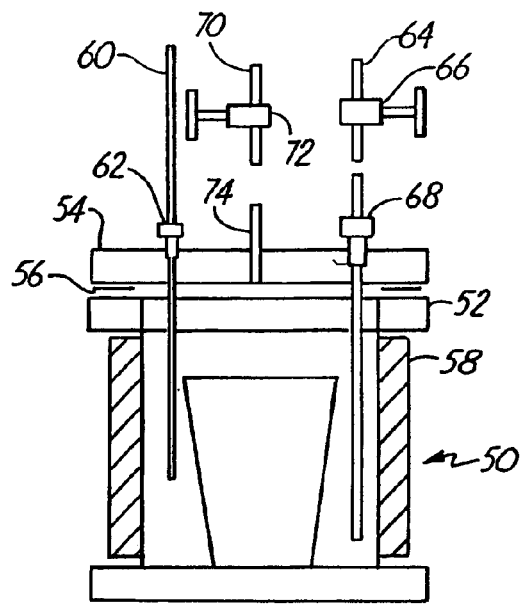
FIG. 1 is a schematic sectional view of a solid precursor delivery system taken through the center of the system.

Small scale particles can be used as improved phosphor particles. In particular, particles on the order of 100 nm or less have superior processing properties to produce displays, and they have good luminescence. Significantly, the band gap of these materials is size dependent at diameters on the order of 100 nm or less. Therefore, particles with a selected, narrow distribution of diameters can serve as a phosphor at one color (wavelength) while particles of the same or different material with similarly selected average diameter and narrow distribution of sizes can serve as a phosphor at a different color. In addition, the small size of the particles can be advantageous for the production of higher resolution displays.

Appropriate particles generally are chalcogenides, especially ZnO, ZnS, $TiO_2$, and $Y_2O_3$. Preferred particles have a desired emission frequency and are highly luminescent. In addition, preferred particles have persistent emission, i.e., the emission decays over a significant period of time following electrical stimulation of the material. Specifically, there should be sufficient persistence of the emission to allow for human perception. Suitable particles generally are semiconductors, and their emission frequency is determined by the band gap. Preferably, the luminescing state has an energy such that little energy is wasted as heat.

Laser pyrolysis, as described below, is an excellent way of efficiently producing ZnO, ZnS, $TiO_2$, and $Y_2O_3$ particles with narrow distributions of average particle diameters. Generally, the particle size distributions drop off very rapidly such that it does not have a significant tail. A basic feature of successful application of laser pyrolysis for the production of appropriate small scale particles is generation of a reactant stream containing a metal precursor compound, a radiation absorber and a reactant serving as an oxygen or sulfur source, as appropriate. The metal precursor can act as the radiation absorbing compound and/or the oxygen source. The reactant stream is pyrolyzed by an intense laser beam. The intense heat resulting from the absorption of the laser radiation induces the reaction of the metal compound precursor in the oxygen or sulfur environment. As the reactant stream leaves the light beam, the particles are rapidly quenched.

The reactants for performing laser pyrolysis can be supplied in vapor form. Alternatively, one or more reactants can be supplied as an aerosol. The use of an aerosol provides for the use of a wider range of metal precursors than are suitable for vapor delivery only. Thus, less expensive precursors can be used with aerosol delivery in some cases. Also, aerosol delivery can be used for high particle production rates. Suitable control of the reaction conditions with the aerosol results in nanoscale particles with a narrow particle size distribution.

In particular, laser pyrolysis is a convenient approach for the formation of zinc oxide nanoparticles. The crystalline zinc oxide nanoparticles have very small particle diameters and a very narrow particle size distribution. Zinc oxide powders are useful as phosphors and can be used in a variety of other applications, such as the production of electronic components, for example, resistors of various types.

A. Particle Production Using Laser Pyrolysis

Laser pyrolysis has been discovered to be a valuable tool for the production of nanoscale phosphorescent particles, including, in particular, zinc oxide particles. In addition, the particles produced by laser pyrolysis are a convenient material for further processing to expand the pathways for the production of desirable zinc oxide particles. Thus, using laser pyrolysis alone or in combination with additional processes, a wide variety of zinc oxide particles can be produced.

The reaction conditions determine the qualities of the particles produced by laser pyrolysis.

The reaction conditions for laser pyrolysis can be controlled relatively precisely in order to produce particles with desired properties. The appropriate reaction conditions to produce a certain type of particles generally depend on the design of the particular apparatus. Specific conditions used to produce zinc oxide particles in a particular apparatus are described below in the Example. Furthermore, some general observations on the relationship between reaction conditions and the resulting particles can be made.

Increasing the laser power results in increased reaction temperatures in the reaction region as well as a faster quenching rate. A rapid quenching rate tends to favor production of high energy phases, which may not be obtained with processes near thermal equilibrium. Similarly, increasing the chamber pressure also tends to favor the production of higher energy structures. Also, increasing the concentration of the reactant serving as the oxygen source in the reactant stream favors the production of particles with increased amounts of oxygen.

Reactant flow rate and velocity of the reactant gas stream are inversely related to particle size so that increasing the reactant gas flow rate or velocity tends to result in smaller particle sizes. Also, the growth dynamics of the particles have a significant influence on the size of the resulting particles. In other words, different forms of a product compound have a tendency to form different size particles from other phases under relatively similar conditions. Light intensity/laser power also influences particle size with increased light intensity favoring larger particle formation for lower melting materials and smaller particle formation for higher melting materials.

Laser pyrolysis has been performed generally with gas phase reactants. The use of exclusively gas phase reactants is somewhat limiting with respect to the types of precursor compounds that can be used practically. Thus, techniques have been developed to introduce aerosols containing reactant precursors into laser pyrolysis chambers. Improved aerosol delivery apparatuses for reactant systems are described further in commonly assigned and copending U.S. patent application Ser. No. 09/188,670, now U.S. Pat. No. 6,193,936 to Gardner et al., entitled "Reactant Delivery Apparatuses," filed Nov. 9, 1998, incorporated herein by reference.

Using aerosol delivery apparatuses, solid precursor compounds can be delivered by dissolving the compounds in a solvent. Alternatively, powdered precursor compounds can be dispersed in a liquid/solvent for aerosol delivery. Liquid precursor compounds can be delivered as an aerosol from a neat liquid, a multiple liquid dispersion or a liquid solution, if desired. Aerosol reactants can be used to obtain a significant reactant throughput. The solvent, if any, can be selected to achieve desired properties of the solution. Suitable solvents include water, methanol, ethanol, isopropyl alcohol, other organic solvents and mixtures thereof. The solvent should have a desired level of purity such that the resulting particles have a desired purity level. Some solvents, such as isopropyl alcohol, are significant absorbers of infrared light from a $CO_2$ laser such that no additional laser absorbing compound is needed within the reactant stream.

If aerosol precursors are formed with a solvent present, the solvent preferably is rapidly evaporated by the light beam in the reaction chamber such that a gas phase reaction can take place. Thus, the fundamental features of the laser pyrolysis reaction are unchanged. Nevertheless, the reaction conditions are affected by the presence of the aerosol. Below in the Example, conditions are described for the production of zinc oxide nanoparticles using aerosol precursors in a particular laser pyrolysis reaction chamber. Thus, the parameters associated with aerosol reactant delivery can be explored further based on the description below.

A number of suitable solid, zinc precursor compounds can be delivered as an aerosol from solution. For example, zinc chloride ($ZnCl_2$) and zinc nitrate ($Zn(NO_3)_2$) are soluble in water and some organic solvents, such as isopropyl alcohol. The compounds are dissolved in a solution preferably with a concentration greater than about 0.5 molar. Generally, the greater the concentration of precursor in the solution the greater the throughput of reactant through the reaction chamber. As the concentration increases, however, the solution can become more viscous such that the aerosol has droplets with larger sizes than desired. Thus, selection of solution concentration can involve a balance of factors in the selection of a preferred solution concentration.

Appropriate zinc precursor compounds for gaseous delivery generally include zinc compounds with reasonable vapor pressures, i.e., vapor pressures sufficient to get desired amounts of precursor vapor in the reactant stream. The vessel holding liquid or solid precursor compounds can be heated to increase the vapor pressure of the zinc precursor, if desired. Suitable solid, zinc precursors with sufficient vapor pressure of gaseous delivery include, for example, zinc chloride ($ZnCl_2$). A suitable container for heating and delivering a solid precursor to a laser pyrolysis apparatus is shown in FIG. 1. Suitable liquid zinc precursor compounds include, for example, diethyl zinc ($Zn(C_2H_5)_2$) and dimethyl zinc ($Zn(CH_3)_2$).

Referring to FIG. 1, the solid precursor delivery apparatus 50 for vapor delivery includes a container 52 and a lid 54. A gasket 56 is located between container 52 and lid 54. In one preferred embodiment, container 52 and lid 54 are made from stainless steel, and gasket 56 is made from copper. In this embodiment, lid 54 and gasket 56 are bolted to container 52. Other inert materials, such as Pyrex®, suitable for the temperatures and pressures applied to the solid precursor system can be used. Container 52 is surrounded with a band heater 58, which is used to set the temperature of the delivery apparatus 50 at desired values. Suitable band heaters are available from Omega Engineering Inc. Stamford, Conn. The temperature of the band heater can be adjusted to yield a desired vapor pressure of the precursor compound. Additional portions of the precursor delivery system can be heated to maintain the precursor in a vapor state after it has left container 52.

Preferably, a thermocouple 60 is inserted into container 52 through lid 54. Thermocouple 60 can be inserted by way of a Swagelok® fitting 62 or other suitable connection. Tubing 64 provides a input flow of a carrier gas into container 52. Tubing 64 preferably includes a shut off valve 66 and can be inserted through lid 54 by way of a Swagelok® fitting 68 or other suitable connection. Output tube 70 also preferably includes a shut off valve 72. Output tube 70 preferably enters into container 52 through lid 54 at a sealed connection 74. Tubes 64 and 70 can be made of any suitable inert material such as stainless steel. A solid precursor can be placed directly within container 52 or it can be placed within a smaller, open container within container 52.

Preferred secondary reactants serving as oxygen source include, for example, $O_2$, CO, $CO_2$, $O_3$ and mixtures thereof. The secondary reactant compound should not react significantly with the zinc precursor prior to entering the reaction zone since this generally would result in the formation of large particles. If the zinc precursor would react with the secondary reactant compound, the two reactants can be delivered with a dual nozzle reactant delivery apparatus, as described further below, such that the two reactants do not mix until they are in the reaction chamber. Note that diethyl zinc and $O_2$ react spontaneously.

Laser pyrolysis can be performed with a variety of optical frequencies. Preferred light sources operate in the infrared portion of the electromagnetic spectrum. $CO_2$ lasers are particularly preferred sources of light. Infrared absorbers for inclusion in the reactant stream include, for example, $C_2H_4$, isopropyl alcohol, $NH_3$, $SF_6$, $SiH_4$ and $O_3$. $O_3$ can act as both an infrared absorber and as an oxygen source. The radiation absorber, such as the infrared absorber, absorbs energy from the radiation beam and distributes the energy to the other reactants to drive the pyrolysis.

Preferably, the energy absorbed from the light beam increases the temperature at a tremendous rate, many times the rate that heat generally would be produced by exothermic reactions under controlled condition. While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction.

An inert shielding gas can be used to reduce the amount of reactant and product molecules contacting the reactant chamber components. Appropriate shielding gases include, for example, Ar, He and $N_2$.

An appropriate laser pyrolysis apparatus generally includes a reaction chamber isolated from the ambient environment. A reactant inlet connected to a reactant delivery apparatus produces a reactant stream through the reaction chamber. A laser beam path intersects the reactant stream at a reaction zone. The reactant stream continues after the reaction zone to an outlet, where the reactant stream exits the reaction chamber and passes into a collection apparatus. Generally, the light source, such as a laser, is located external to the reaction chamber, and the light beam enters the reaction chamber through an appropriate window.

Figure 2:
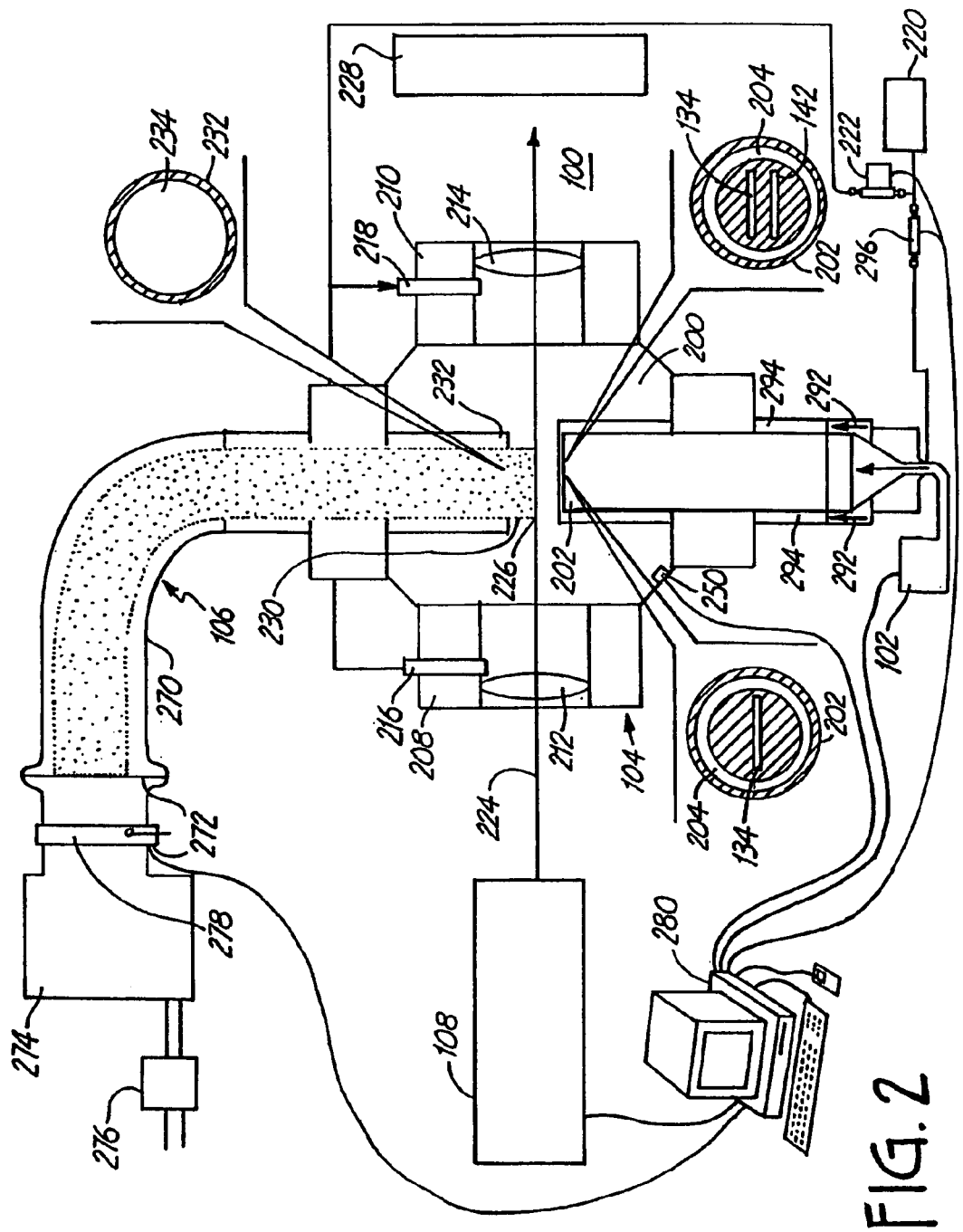
FIG. 2 is a schematic, sectional view of an embodiment of a laser pyrolysis apparatus taken through the middle of the laser radiation path. The lower inserts are bottom views of the injection nozzle with one or two reactant inlets, and the upper insert is a bottom view of the collection nozzle.

Referring to FIG. 2, a particular embodiment 100 of a laser pyrolysis system involves a reactant delivery apparatus 102, reaction chamber 104, collection apparatus 106, light source 108 and shielding gas delivery apparatus 110. Alternative reaction delivery apparatuses 102 can be used with the apparatus of FIG. 2. A first reaction delivery apparatus described below can be used to deliver exclusively gaseous reactants. Two alternative reactant delivery apparatuses are described for delivery of one or more reactants as an aerosol.

Figure 3:
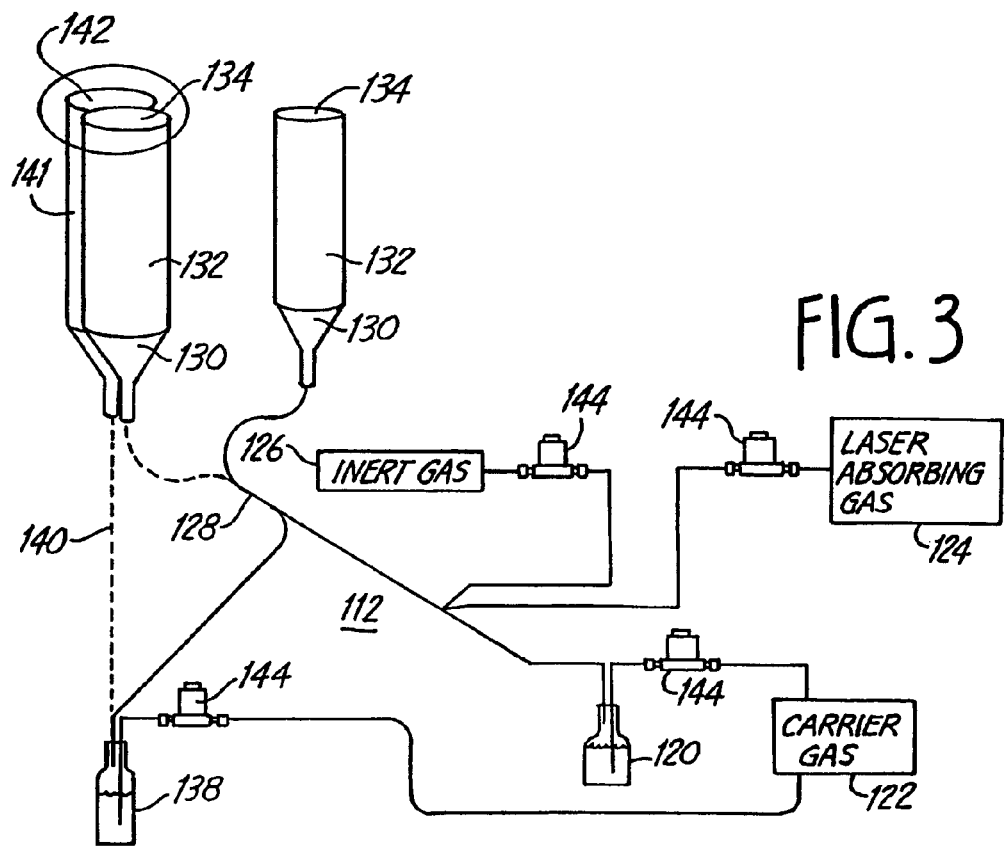
FIG. 3 is a schematic view of a reactant delivery apparatus for the delivery of vapor reactants to the laser pyrolysis apparatus of FIG. 2.

Referring to FIG. 3, a first embodiment 112 of reactant delivery apparatus 102 includes a source 120 of a precursor compound. For liquid or solid reactants, a carrier gas from one or more carrier gas sources 122 can be introduced into precursor source 120 to facilitate delivery of the reactant. Precursor source 120 can be a solid precursor delivery apparatus 50, as shown in FIG. 1, or other suitable container. The carrier gas from carrier gas source 122 preferably is either an infrared absorber and/or an inert gas. Carrier gas preferably is bubbled through a liquid reactant compound or delivered into a solid reactant delivery apparatus. The quantity of reactant vapor in the reaction zone is roughly proportional to the flow rate of the carrier gas. A liquid or solid reactant can be heated to increase its vapor pressure. Similarly, portions of reactant delivery apparatus 102 can be heated to inhibit the deposition of reactant compound on the walls of the delivery apparatus.

Alternatively, carrier gas can be supplied directly from infrared absorber source 124 and/or inert gas source 126, as appropriate. The gases from precursor source 120 are mixed with gases from infrared absorber source 124 and/or inert gas source 126 by combining the gases in a single portion of tubing 128. The gases are combined a sufficient distance from reaction chamber 104 such that the gases become well mixed prior to their entrance into reaction chamber 104. The combined gas in tube 128 passes through a duct 130 into channel 132, which is in fluid communication with reactant inlet 134, which can be part of a multiple inlet delivery apparatus, as shown in phantom lines in FIG. 3.

A second reactant can be supplied from second reactant source 138, which can be a liquid reactant delivery apparatus, a solid reactant delivery apparatus, a gas cylinder or other suitable container or containers. If second reactant source 138 delivers a liquid or solid reactant, carrier gas from carrier gas source 122 or an alternative carrier gas source can be used to facilitate delivery of the reactant. As shown in FIG. 3, second reactant source 138 delivers a second reactant to duct 130 by way of tube 128. Alternatively, second reactant source 138 can deliver the second reactant to tube 140 for delivery through duct 141 to a second reactant inlet 142, as depicted with phantom lines in FIG. 3. Inlets 134, 142 can be angled slightly toward each other to facilitate mixing of the gases.

With alternative delivery through reactant inlets 134 and 142, the first and second reactants are mixed within the reaction chamber after exiting from the reactant inlets. This is particularly advantageous if the reactants spontaneously react, such as diethyl zinc and molecular oxygen. If more than two reactants are used, the additional reactants can similarly be delivered through a single reactant inlet 134, through two inlets 134, 142, or through more than two reactant inlets, as appropriate or desired. Mass flow controllers 144 can be used to regulate the flow of gases within the reactant delivery system of FIG. 3.

As noted above, the reactant stream can include one or more aerosols. The aerosols can be formed within reaction chamber 104 or outside of reaction chamber 104 prior to injection into reaction chamber 104. If the aerosols are produced prior to injection into reaction chamber 104, the aerosols can be introduced through reactant inlets comparable to those used for gaseous reactants, such as reactant inlet 134 in FIG. 3.

Figure 4:
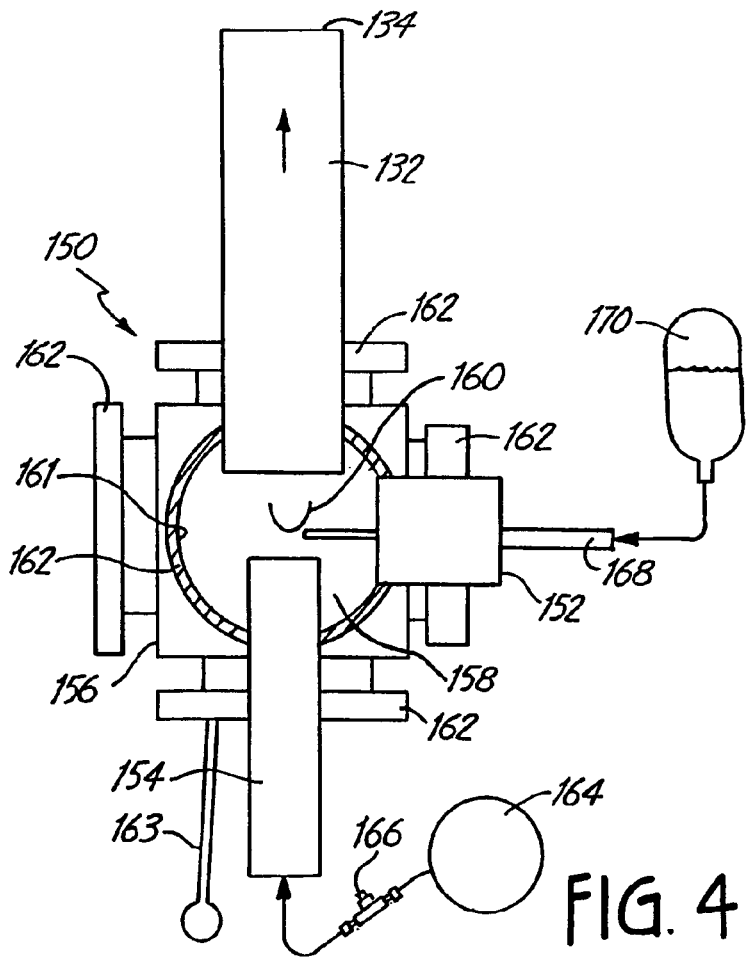
FIG. 4 is schematic, side view of a reactant delivery apparatus for the delivery of an aerosol reactant to the laser pyrolysis apparatus of FIG. 2.

Referring to FIG. 4, an alternative embodiment 150 of the reactant supply system 102 is used to supply an aerosol to channel 132. As described above, channel 132 forms part of an injection nozzle for directing reactants into the reaction chamber and terminates at reactant inlet 134. Reactant supply system 150 includes an aerosol generator 152, carrier gas/vapor supply tube 154 and junction 156. Channel 132, aerosol generator 152 and supply tube 154 meet within interior volume 158 of junction 156. Supply tube 154 is oriented to direct carrier gas along channel 132. Aerosol generator 152 is mounted such that an aerosol 160 is generated in the volume of chamber 158 between the opening into channel 134 and the outlet from supply tube 154.

Aerosol generator 152 can operate based on a variety of principles. For example, the aerosol can be produced with an ultrasonic nozzle, with an electrostatic spray system, with a pressure-flow or simplex atomizer, with an effervescent atomizer or with a gas atomizer where liquid is forced under significant pressure through a small orifice and fractured into particles by a colliding gas stream. Suitable ultrasonic nozzles can include piezoelectric transducers. Ultrasonic nozzles with piezoelectric transducers and suitable broadband ultrasonic generators are available from Sono-Tek Corporation, Milton, N.Y., such as model 8700-120. Suitable aerosol generators are described further in copending and commonly assigned, U.S. patent application Ser. No. 09/188,670, now U.S. Pat. No. 6,193,936 to Gardner et al., entitled "REACTANT DELIVERY APPARATUSES," incorporated herein by reference. Additional aerosol generators can be attached to junction 156 through other ports 162 such that additional aerosols can be generated in interior 158 for delivery into the reaction chamber.

Junction 156 includes ports 162 to provide access from outside junction 156 to interior 158. Thus, channel 132, aerosol generator 152 and supply tube 154 can be mounted appropriately. In one embodiment, junction 156 is cubic with six cylindrical ports 162, with one port 162 extending from each face of junction 156. Junction 156 can be made from stainless steel or other durable, noncorrosive material. A window 161 preferably is sealed at one port 162 to provide for visual observation into interior 158. The port 162 extending from the bottom of junction 156 preferably includes a drain 163, such that condensed aerosol that is not delivered through channel 134 can be removed from junction 156.

Carrier gas/vapor supply tube 154 is connected to gas source 164. Gas source 164 can include one or a plurality of gas containers that are connected to deliver a selected gas or gas mixture to supply tube 154. Carrier gas can be passed through a liquid precursor delivery apparatus or a solid precursor delivery apparatus, such that the carrier gas includes vapor of a liquid precursor or a solid precursor. Thus, carrier gas/vapor supply tube 154 can be used to deliver a variety of desired gases and/or vapors within the reactant stream including, for example, laser absorbing gases, reactants, and/or inert gases. The flow of gas from gas source 164 to supply tube 154 preferably is controlled by one or more mass flow controllers 166 or the like. Liquid supply tube 168 is connected to aerosol generator 152. Liquid supply tube 168 is connected to aerosol generator 152 and to liquid supply 170. For the production of zinc oxide particles, liquid supply 170 can hold a liquid comprising a zinc precursor.

In the embodiment shown in FIG. 4, aerosol generator 152 generates an aerosol with momentum roughly orthogonal to the carrier gas flow from tube 154 to channel 132. Thus, carrier gas/vapor from supply tube 154 directs aerosol precursor generated by aerosol generator 152 into channel 132. In operation, carrier gas flow directs the aerosol delivered within chamber 158 into channel 132. In this way, the delivery velocity of the aerosol is determined effectively by the flow rate of the carrier gas.

In alternative preferred embodiments, the aerosol generator is placed at an upward angle relative to the horizontal, such that a component of the forward momentum of the aerosol is directed along channel 134. In a preferred embodiment, the output directed from the aerosol generator is placed at about a 45° angle relative to the normal direction defined by the opening into channel 134, i.e. the direction of the flow into channel 134 from supply tube 154.

Figure 5:
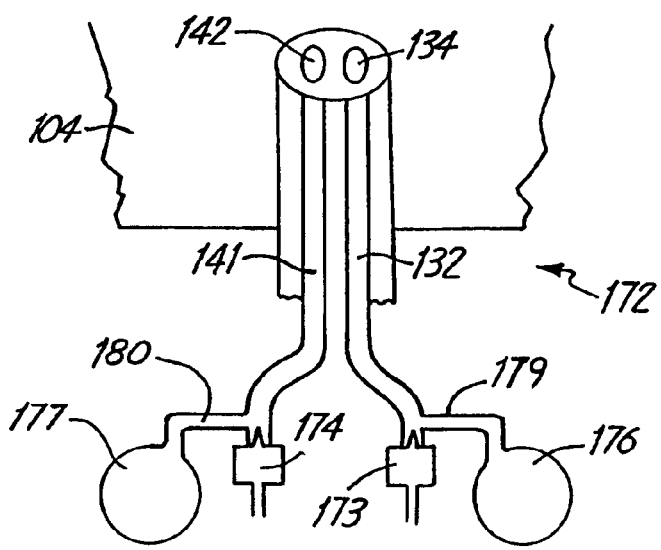
FIG. 5 is schematic, side view of an alternative embodiment of a reactant delivery apparatus for the delivery of two aerosols to the laser pyrolysis apparatus of FIG. 2.

Referring to FIG. 5, an alternative embodiment 172 of reactant delivery apparatus 102 is shown for delivery of two aerosol reactants. Aerosol generators 173, 174 deliver aerosol into delivery tubes 132, 141, respectively. Channels 132, 141 deliver reactants to reactant inlets 134, 142, respectively. Aerosol generators 173, 174 can operate based on a variety of principles, as described above with respect to aerosol generator 152.

Reactant gases, inert gases and/or light absorbing gases can be supplied according to any of a variety of configurations into channels 132, 141, as desired, by way of gas sources 176, 177 and gas supply tubes 179, 180. For example, gas supply tubes 179, 180 can connect with channels 132, 141 a various positions above or below aerosol generators 173, 174 and angles relative to the orientation of channels 132, 141. Multiple gas supply tubes can be used for each channel 132, 141, if desired. Alternatively, one of aerosol generators 173, 174 can be eliminated such that reactant delivery apparatus 172 delivers an aerosol and a gaseous reactant through reactant inlets 134, 142, respectively.

Alternative embodiments can be based on variation of the embodiments of FIG. 5 to deliver reactants by way of a single reactant inlet 134. In these embodiments, there is a single channel 132. The second aerosol generator can be eliminated or configured to deliver an aerosol into the same channel as the first aerosol generator. Thus, these alternative embodiments can be used to deliver into reaction chamber 104, an aerosol reactant and a gaseous reactant, two aerosol reactants or more than two reactants with one or more aerosols through a single reactant inlet 134.

Referring to FIG. 2, reaction chamber 104 includes a main chamber 200. Reactant supply system 102 connects to the main chamber 200 at injection nozzle 202. Reaction chamber 104 can be heated to keep the precursor compound in the vapor state. In particular, the entire reaction chamber 104 preferably is heated to about 120° C. when the vapor of a solid precursor is used. Similarly, the argon shielding gas preferably is heated to about 150° C. when the vapor of a solid precursor is used. The chamber can be examined for condensation to ensure that precursor is not deposited on the chamber.

The end of injection nozzle 202 has an annular opening 204 for the passage of inert shielding gas, and reactant inlet 134 for the passage of reactants to form a reactant stream in the reaction chamber. Reactant inlet 134 preferably is a slit, as shown in the lower left insert of FIG. 2. Annular opening 204 has, for example, a diameter of about 1.5 inches and a width along the radial direction from about ⅛ in to about 1/16 in. The flow of shielding gas through annular opening 204 helps to prevent the spread of the reactant gases and product particles throughout reaction chamber 104. For embodiments having two reactant inlets 134, 142, two slits or other shapes are present at the end of nozzle 202, as shown in the insert in the lower right of FIG. 2.

Tubular sections 208, 210 are located on either side of injection nozzle 202. Tubular sections 208, 210 include ZnSe windows 212, 214, respectively. Windows 212, 214 are about 1 inch in diameter. Windows 212, 214 are preferably cylindrical lenses with a focal length equal to the distance between the center of the chamber to the surface of the lens to focus the light beam to a point just below the center of the nozzle opening. Windows 212, 214 preferably have an antireflective coating. Appropriate ZnSe lenses are available from Janos Technology, Townshend, Vt. Tubular sections 208, 210 provide for the displacement of windows 212, 214 away from main chamber 200 such that windows 212, 214 are less likely to be contaminated by reactants and/or products. Window 212, 214 are displaced, for example, about 3 cm from the edge of the main chamber 200.

Windows 212, 214 are sealed with a rubber o-ring to tubular sections 208, 210 to prevent the flow of ambient air into reaction chamber 104. Tubular inlets 216, 218 provide for the flow of shielding gas into tubular sections 208, 210 to reduce the contamination of windows 212, 214. Tubular inlets 216, 218 are connected to inert gas source 220 or to a separate inert gas source. In either case, flow to inlets 216, 218 preferably is controlled by a mass flow controller 222.

Light source 108 is aligned to generate a light beam 224 that enters window 212 and exits window 214. Windows 212, 214 define a light path through main chamber 200 intersecting the flow of reactants at reaction zone 226. After exiting window 214, light beam 222 strikes power meter 228, which also acts as a beam dump. An appropriate power meter is available from Coherent Inc., Santa Clara, Calif. Light source 108 can be a laser or an intense conventional light source such as an arc lamp. Preferably, light source 108 is an infrared laser, especially a CW $CO_2$ laser such as an 1800 watt maximum power output laser available from PRC Corp., Landing, N.J.

Reactants passing through reactant inlet 134 or inlets 134, 142 in injection nozzle 202 initiate a reactant stream. The reactant stream passes through reaction zone 226, where reaction involving the zinc or other metal precursor compound takes place. Heating of the gases in reaction zone 226 is extremely rapid, roughly on the order of $10^5$ degree C./sec depending on the specific conditions. The reaction is rapidly quenched upon leaving reaction zone 226, and particles 230 are formed in the reactant stream. The nonequilibrium nature of the process allows for the production of nanoparticles with a highly uniform size distribution and structural homogeneity.

The path of the reactant stream continues to collection nozzle 232. Collection nozzle 232 is spaced about 2 cm from injection nozzle 202. The small spacing between injection nozzle 202 and collection nozzle 232 helps reduce the contamination of reaction chamber 104 with reactants and products. Collection nozzle 232 has a circular opening 234, as shown in the upper insert of FIG. 2. Circular opening 234 feeds into collection apparatus 106.

The chamber pressure is monitored with a pressure gauge 250 attached to main chamber 200. The preferred chamber pressure for the production of the desired oxides generally ranges from about 80 Torr to about 700 Torr.

Reaction chamber 104 has two additional tubular sections not shown. One of the additional tubular sections projects into the plane of the sectional view in FIG. 2, and the second additional tubular section projects out of the plane of the sectional view in FIG. 2. When viewed from above, the four tubular sections are distributed roughly, symmetrically around the center of the chamber. These additional tubular sections have windows for observing the inside of the chamber. In this configuration of the apparatus, the two additional tubular sections are not used to facilitate production of particles.

Collection apparatus 106 preferably includes a curved channel 270 leading from collection nozzle 230. Because of the small size of the particles, the product particles generally follow the flow of the gas around curves. Collection apparatus 106 includes a filter 272 within the gas flow to collect the product particles. Due to curved section 270, the filter is not supported directly above the chamber. A variety of materials such as Teflon, glass fibers and the like can be used for the filter as long as the material is inert and has a fine enough mesh to trap the particles. Preferred materials for the filter include, for example, a glass fiber filter from ACE Glass Inc., Vineland, N.J. and cylindrical Nomex® filters from AF Equipment Co., Sunnyvale, Calif.

Pump 274 is used to maintain collection system 106 at a selected pressure. A variety of different pumps can be used. Appropriate pumps for use as pump 274 include, for example, Busch Model B0024 pump from Busch, Inc., Virginia Beach, Va. with a pumping capacity of about 25 cubic feet per minute (cfm) and Leybold Model SV300 pump from Leybold Vacuum Products, Export, Pa. with a pumping capacity of about 195 cfm. It may be desirable to flow the exhaust of the pump through a scrubber 276 to remove any remaining reactive chemicals before venting into the atmosphere. The entire system 100 or portions thereof can be placed in a fume hood for ventilation purposes and for safety considerations. Generally, light source 108 remains outside of the fume hood because of its large size.

Reaction system 100 or components thereof preferably is controlled by a computer 280. Generally, computer 280 controls light source 108 and monitors the pressure in the reaction chamber 104 by way of pressure gauge 250 or the like. Computer 280 can be used to control the flow of reactants and/or the shielding gas. The pumping rate is controlled by either a manual needle valve or an automatic throttle valve inserted between pump 274 and filter 272. As the chamber pressure increases due to the accumulation of particles on filter 272, the manual valve or the throttle valve can be adjusted to maintain the pumping rate and the corresponding chamber pressure.

The reaction can be continued until sufficient particles are collected on filter 272 such that pump 274 can no longer maintain the desired pressure in the reaction chamber 104 against the resistance through filter 272. When the pressure in reaction chamber 104 can no longer be maintained at the desired value, the reaction is stopped, and filter 272 is removed. With this embodiment, about 1-300 grams of particles can be collected in a single run before the chamber pressure can no longer be maintained. A single run generally can last up to about 10 hours depending on the type of particle being produced and the type of filter being used.

Referring to FIG. 2, shielding gas delivery apparatus 110 includes inert gas source 220 connected to an inert gas duct 292. Inert gas duct 292 flows into annular channel 294. A mass flow controller 296 regulates the flow of inert gas into inert gas duct 292. If reactant delivery apparatus 112 shown in FIG. 3 is used, inert gas source 126 can also function as the inert gas source for duct 192, if desired. Similarly, separate gas sources can be used to supply inert gas duct 292 and tubes 216, 218.

The reaction conditions can be controlled relatively precisely. The mass flow controllers are quite accurate. The laser generally has about 0.5 percent power stability. With either a manual control or a throttle valve, the chamber pressure can be controlled to within about 1 percent.

The configuration of the reactant supply system 102 and the collection system 106 can be reversed. In this alternative configuration, the reactants are supplied from the top of the reaction chamber, and the product particles are collected from the bottom of the chamber. If mounted below reaction chamber 104, collection system 106 may not include a curved section so that the collection filter is mounted directly below reaction chamber 104.

An alternative design of a laser pyrolysis system has been described in copending and commonly assigned U.S. patent application Ser. No. 08/808,850 now U.S. Pat. No. 5,958,348, entitled "Efficient Production of Particles by Chemical Reaction," incorporated herein by reference. This alternative design is intended to facilitate production of commercial quantities of particles by laser pyrolysis. The reaction chamber is elongated along the laser beam in a dimension perpendicular to the reactant stream to provide for an increase in the throughput of reactants and products. The original design of the apparatus was based on the introduction of gaseous reactants. Alternative embodiments for the introduction of an aerosol into an elongated reaction chamber are described in copending and commonly assigned U.S. patent application Ser. No. 09/188,670, now U.S. Pat. No. 6,193,936 to Gardner et al., filed on Nov. 9, 1998, entitled "Reactant Delivery Apparatuses," incorporated herein by reference.

In general, the alternative pyrolysis apparatus includes a reaction chamber designed to reduce contamination of the chamber walls, to increase the production capacity and to make efficient use of resources. To accomplish these objectives, an elongated reaction chamber is used that provides for an increased throughput of reactants and products without a corresponding increase in the dead volume of the chamber. The dead volume of the chamber can become contaminated with unreacted compounds and/or reaction products.

Figure 6:
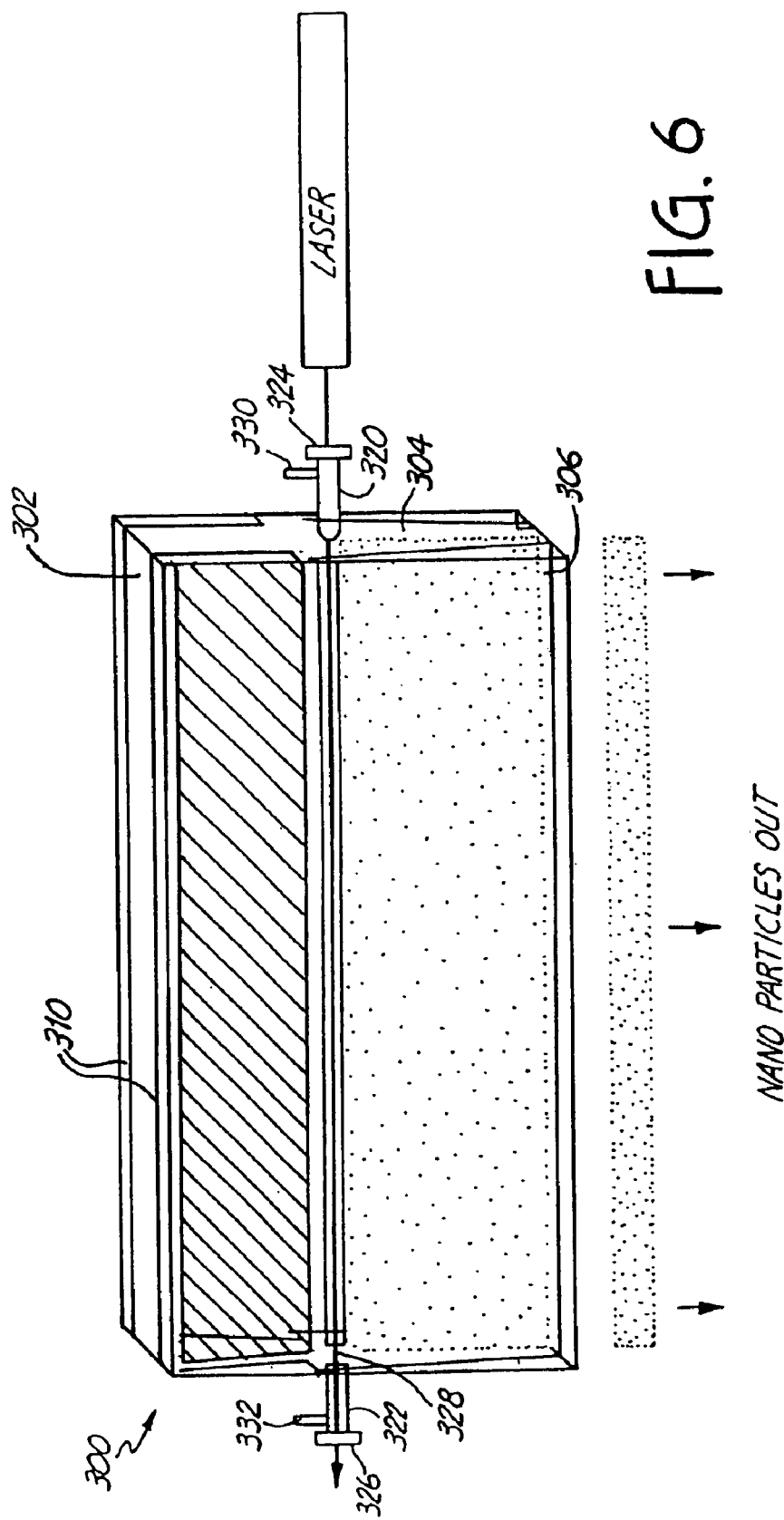
FIG. 6 is a schematic, perspective view of a reaction chamber of an alternative embodiment of the laser pyrolysis apparatus, where the materials of the chamber are depicted as transparent to reveal the interior of the apparatus.

The design of the improved reaction chamber 300 is shown schematically in FIG. 6. A reactant inlet 302 leads to main chamber 304. Reactant inlet 302 conforms generally to the shape of main chamber 304. Main chamber 304 includes an outlet 306 along the reactant/product stream for removal of particulate products, any unreacted gases and inert gases. Shielding gas inlets 310 are located on both sides of reactant inlet 302. Shielding gas inlets are used to form a blanket of inert gases on the sides of the reactant stream to inhibit contact between the chamber walls and the reactants or products.

Tubular sections 320, 322 extend from the main chamber 304. Tubular sections 320, 322 hold windows 324, 326 to define a light beam path 328 through the reaction chamber 300. Tubular sections 320, 322 can include inert gas inlets 330, 332 for the introduction of inert gas into tubular sections 320, 322.

The improved reaction system includes a collection apparatus to remove the nanoparticles from the reactant stream. The collection system can be designed to collect particles in a batch mode with the collection of a large quantity of particles prior to terminating production. Alternatively, the collection system can be designed to run in a continuous production mode by switching between different particle collectors within the collection apparatus or by providing for removal of particles without exposing the collection system to the ambient atmosphere. An alternative preferred embodiment of a collection apparatus for continuous particle production is described in copending and commonly assigned U.S. patent application Ser. No. 09/107,729, now U.S. Pat. No. 6,270,732 to Gardner et al., entitled "Particle Collection Apparatus And Associated Methods," incorporated herein by reference. The collection apparatus can include curved components within the flow path similar to curved portion of the collection apparatus shown in FIG. 2.

Figure 7:
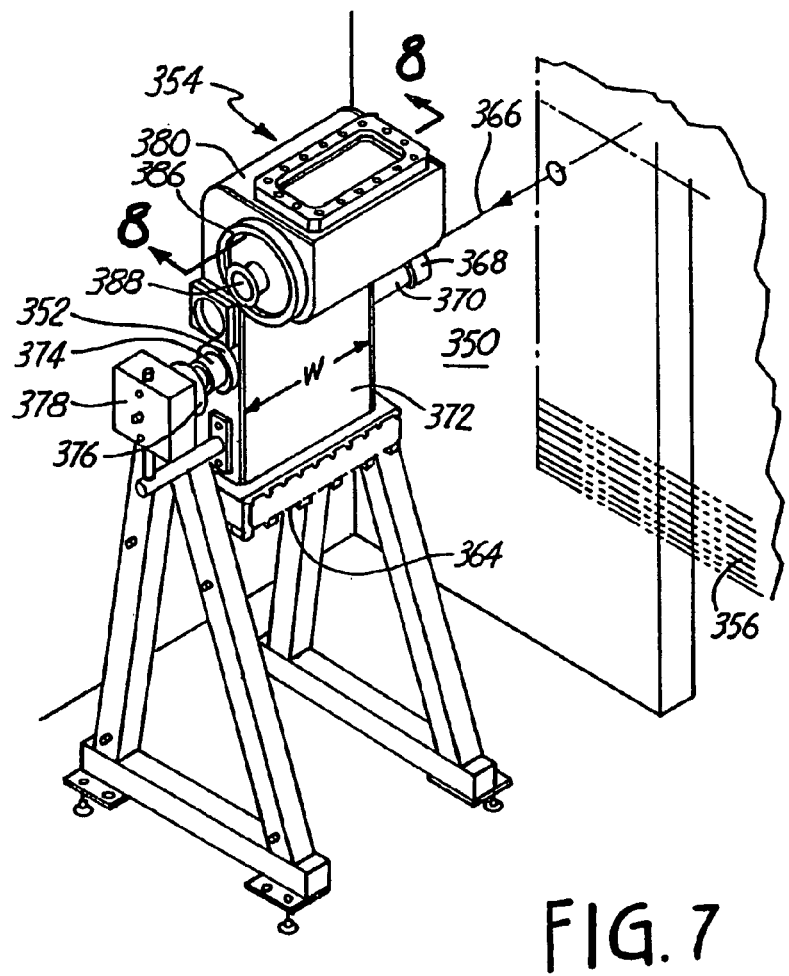
FIG. 7 is a perspective view of an embodiment of a laser pyrolysis apparatus with an elongated reaction chamber.

Referring to FIG. 7, a specific embodiment 350 of a laser pyrolysis reaction system with an elongated reaction chamber is shown. In this embodiment, the reaction chamber can be used with a reaction delivery apparatus designed for the delivery of only gaseous reactants or with an reactant delivery apparatus that can deliver aerosol reactants along with any desired gases. Laser pyrolysis reaction apparatus 350 includes reaction chamber 352, a particle collection apparatus 354, light source 356 and a reactant delivery system attached at inlet 364.

Reaction chamber 352 includes inlet 364 at the bottom of reaction chamber 352 where the reactant delivery apparatus connects with reaction chamber 352. Nozzles associated with the reactant delivery apparatus can extend into reaction chamber 352. Gaseous reactants can be delivered through a nozzle elongated to conform generally to the elongation of reaction chamber 352. Similarly, aerosols can be delivered to account for the elongated shape of the reaction chamber.

In this embodiment, the reactants are delivered from the bottom of reaction chamber 352 while the products are collected from the top of reaction chamber 352. The configuration can be reversed with the reactants supplied from the top and product collected from the bottom, if desired. Shielding gas conduits can be located in appropriate positions around reactant inlet 364. The shielding gas conduits direct shielding gas along the walls of reaction chamber 352 to inhibit association of reactant gases or products with the walls.

Reaction chamber 352 is elongated along one dimension denoted in FIG. 7 by "w". A laser beam path 366 enters reaction chamber 352 through a window 368 displaced along a tube 370 from main chamber 372 and traverses the elongated direction of reaction chamber 352. The laser beam passes through tube 374 and exits window 376. In one preferred embodiment, tubes 370 and 374 displace windows 368 and 376 about 11 inches from main chamber 372. The laser beam terminates at beam dump 378. In operation, the laser beam intersects a reactant stream generated through reactant inlet 364.

Figure 8:
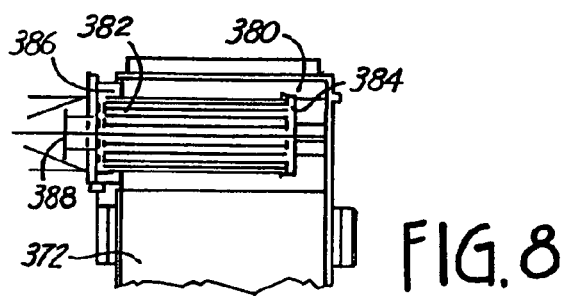
FIG. 8 is a sectional view of the laser pyrolysis apparatus of FIG. 7, where the section is taken along line 8-8 of FIG. 7.
Figure 9:
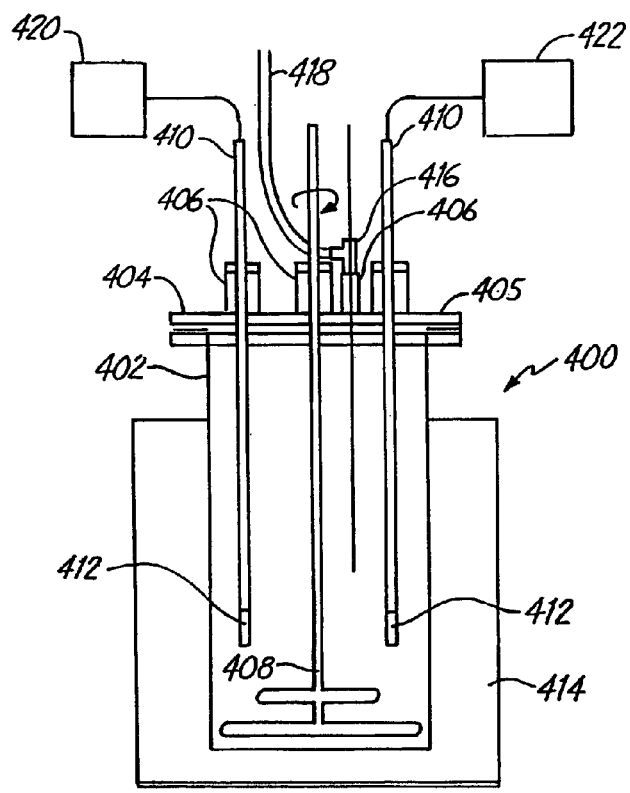
FIG. 9 is a schematic, sectional view of an apparatus for heat treating nanoparticles, in which the section is taken through the center of the apparatus.

The top of main chamber 372 opens into particle collection system 354. Particle collection system 354 includes outlet duct 380 connected to the top of main chamber 372 to receive the flow from main chamber 372. Outlet duct 380 carries the product particles out of the plane of the reactant stream to a cylindrical filter 382, as shown in FIG. 8. Filter 382 has a cap 384 on one end to block direct flow into the center of filter 382. The other end of filter 382 is fastened to disc 386. Vent 388 is secured to the center of disc 386 to provide access to the center of filter 382. Vent 388 is attached by way of ducts to a pump.

Thus, product particles are trapped on filter 382 by the flow from the reaction chamber 352 to the pump. Suitable pumps were described above with respect to the first laser pyrolysis apparatus in FIG. 2. Suitable filters for use as filter 382 include, for example, an air cleaner filter for a Saab 9000 automobile (Purilator part A44-67), which is wax impregnated paper with Plasticol™ or polyurethane end cap 384. The configuration of the reactant injection components and the collection system can be reversed such that the particles are collected at the top of the apparatus.

The collection apparatus shown in FIGS. 7 and 8 is suitable for the operation of reaction chamber 352 in batch mode, where operation is stopped when filter 382 can no longer collect additional particles. Alternative collection apparatuses are suitable for operating reaction chamber 352 in continuous operation, as described above.

The dimensions of elongated reaction chamber 352 and reactant inlet 364 preferably are designed for high efficiency particle production. Reasonable dimensions for reactant inlet 364 for the production of zinc oxide nanoparticle, when used with a 1800 watt $CO_2$ laser, are from about 5 mm to about 1 meter.

As noted above, properties of the zinc oxide particles can be modified by further processing. In particular, zinc oxide nanoscale particles can be heated in an oven in an oxidizing environment or an inert environment to alter the oxygen content, to change the crystal lattice, or to remove adsorbed compounds on the particles to improve the quality of the particles.

The starting material for the heat treatment can be any collection of zinc oxide particles of any size and shape. Nanoscale particles are preferred starting materials. Suitable nanoscale starting materials have been produced by laser pyrolysis. In addition, particles used as starting material can have been subjected to one or more prior heating steps under different conditions. The processing of metal oxide nanoscale particles in an oven is discussed further in copending and commonly assigned, U.S. patent application Ser. No. 08/897,903 now U.S. Pat. No. 5,989,514, filed Jul. 21, 1997, entitled "Processing of Vanadium Oxide Particles With Heat," incorporated herein by reference.

The zinc oxide particles are preferably heated in an oven or the like to provide generally uniform heating. The processing conditions generally are mild, such that significant amounts of particle sintering does not occur. The temperature of heating preferably is low relative to the melting point of both the starting material and the product material.

The atmosphere for the heating process can be an oxidizing atmosphere or an inert atmosphere, although a different product may form depending on the nature of the gas in contact with the sample. The atmosphere over the particles can be static, or gases can be flowed through the system. Appropriate oxidizing gases include, for example, $O_2$, $O_3$, CO, $CO_2$, and combinations thereof. The $O_2$ can be supplied as air.

Oxidizing gases optionally can be mixed with inert gases such as Ar, He and $N_2$. When inert gas is mixed with the oxidizing gas, the gas mixture can be from about 1 percent oxidizing gas to about 99 percent oxidizing gas, and more preferably from about 5 percent oxidizing gas to about 99 percent oxidizing gas. Alternatively, either essentially pure oxidizing gas or pure inert gas can be used, as desired.

The precise conditions can be altered to vary the characteristics of the zinc oxide product produced. For example, the temperature, time of heating, heating and cooling rates, the gases and the exposure conditions with respect to the gases can all be changed, as desired. Generally, while heating under an oxidizing atmosphere, the longer the heating period the more oxygen that is incorporated into the material, prior to reaching equilibrium. Once equilibrium conditions are reached, the overall conditions determine the crystalline phase of the powders.

A variety of ovens or the like can be used to perform the heating. An example of a suitable apparatus 400 to perform this processing is displayed in FIG. 6. Apparatus 400 includes a jar 402, which can be made from glass or other inert material, into which the particles are placed. Suitable glass jars are available from Ace Glass (Vineland, N.J.). The top of glass jar 402 is sealed to a glass cap 404, with a Teflon® gasket 405 between jar 402 and cap 404. Cap 404 can be held in place with one or more clamps. Cap 404 includes a plurality of ports 406, each with a Teflon® brushing. A multiblade stainless steel stirrer 408 preferably is inserted through a central port 406 in cap 404. Stirrer 408 is connected to a suitable motor.

One or more tubes 410 are inserted through ports 406 for the delivery of gases into jar 402. Tubes 410 can be made from stainless steel or other inert material. Diffusers 412 can be included at the tips of tubes 410 to disburse the gas within jar 402. A heater/furnace 414 generally is placed around jar 402. Suitable resistance heaters are available from Glas-col (Terre Haute, Ind.). On port preferably includes a T-connection 416. The temperature within jar 402 can be measured with a thermocouple 416 inserted through a T-connection 416. T-connection 416 can be further connected to a vent 418. Vent 418 provides for the venting of gas circulating through jar 402. Preferably, vent 418 is vented to a fume hood or alternative ventilation equipment.

Preferably, desired gases are flowed through jar 402. Tubes 410 generally are connected to an oxidizing gas source 420 and/or an inert gas source 422. Oxidizing gas source 420 and inert gas source 422 can be gas cylinders or any other suitable containers. Oxidizing gas, inert gas or a combination thereof to produce the desired atmosphere are placed within jar 402 from the appropriate gas source(s).

Various flow rates can be used. The flow rate preferably is between about 1 standard cubic centimeters per minute (sccm) to about 1000 sccm and more preferably from about 10 sccm to about 500 sccm. The flow rate generally is constant through the processing step, although the flow rate and the composition of the gas can be varied systematically over time during processing, if desired. Alternatively, a static gas atmosphere can be used.

For the processing of zinc oxide, for example, the temperatures preferably range from about 50° C. to about 500° C. and more preferably from about 60° C. to about 400° C. The particles preferably are heated for greater than about 5 minutes, and generally, for about 5 minutes to about 100 hours. The heating preferably is continued for from about 2 hours to about 100 hours, more preferably from about 2 hours to about 50 hours. For certain target product particles, additional heating does not lead to further variation in the particle composition.

Some empirical adjustment may be required to produce the conditions appropriate for yielding a desired material. The use of mild conditions avoids interparticle sintering resulting in larger particle sizes. Some controlled sintering of the particles can be performed at somewhat higher temperatures to produce slightly larger, average particle diameters.

B. Particle Properties

A collection of particles of interest generally has an average diameter for the primary particles of less than about 150 nm, preferably less than about 95 nm, more preferably from about. 5 nm to about 50 nm, and even more preferably from about 5 nm to about 25 nm. The primary particles usually have a roughly spherical gross appearance. Upon closer examination, crystalline zinc oxide particles generally have facets corresponding to the underlying crystal lattice. Nevertheless, the primary particles tend to exhibit growth that is roughly equal in the three physical dimensions to give a gross spherical appearance. Generally, 95 percent of the primary particles, and preferably 99 percent, have ratios of the dimension along the major axis to the dimension along the minor axis less than about 2. Diameter measurements on particles with asymmetries are based on an average of length measurements along the principle axes of the particle.

Because of their small size, the primary particles tend to form loose agglomerates due to van der Waals and other electromagnetic forces between nearby particles. Nevertheless, the nanometer scale of the primary particles is clearly observable in transmission electron micrographs of the particles. The particles generally have a surface area corresponding to particles on a nanometer scale as observed in the micrographs. Furthermore, the particles can manifest unique properties due to their small size and large surface area per weight of material.

Furthermore, the particles manifest unique properties due to their small size and large surface area per weight of material. Of particular relevance, the particles have an altered band structure, as described further below. The high surface area generally leads to high luminosity of the particles.

The primary particles preferably have a high degree of uniformity in size. As determined from examination of transmission electron micrographs, the primary particles generally have a distribution in sizes such that at least about 95 percent, and preferably 99 percent, of the primary particles have a diameter greater than about 40 percent of the average diameter and less than about 160 percent of the average diameter. Preferably, the primary particles have a distribution of diameters such that at least about 95 percent of the primary particles have a diameter greater than about 60 percent of the average diameter and less than about 140 percent of the average diameter.

Furthermore, essentially no primary particles have an average diameter greater than about 4 times the average diameter and preferably 3 times the average diameter, and more preferably 2 times the average diameter. In other words, the particle size distribution effectively does not have a tail indicative of a small number of particles with significantly larger sizes. This is a result of the small reaction region and corresponding rapid quench of the particles. An effective cut off in the tail indicates that there are less than about 1 particle in $10^6$ have a diameter greater than a particular cut off value above the average diameter. The narrow size distributions, lack of a tail in the distributions and the roughly spherical morphology can be exploited in a variety of applications, especially for phosphors with narrow emission ranges.

At small crystalline diameters the band properties of the particles are altered. The increase in band gap is approximately in proportion to $1/(\text{particle size})^2$. For especially small particle sizes, the density of states may become low enough that the band description may become incomplete as individual molecular orbitals may play a more prominent role. The qualitative trends should hold regardless of the need to account for a molecular orbital description of the electronic properties.

In addition, with a uniform distribution of small particles, the emission spectrum narrows because of the reduction of inhomogeneous broadening. The result is a sharper emission spectrum with an emission maximum that depends on the average particle diameter. Thus, the use of very small particles may allow for adjustment of emission characteristics without the need to activate the phosphorescent particles with a second metal.

Furthermore, the small size of the particles allows for the formation of very thin layers. Thin layers are advantageous for use with low velocity electrons since the electrons may not penetrate deeply within a layer. The small size of the particles is also conducive to the formation of small patterns, for example using photolithography, with sharp edges between the elements of the pattern. The production of small, sharply separated elements is important for the formation of high resolution displays.

In addition, the nanoparticles generally have a very high purity level. The crystalline zinc oxide nanoparticles produced by the above described methods are expected to have a purity greater than the reactant gases because the crystal formation process tends to exclude contaminants from the lattice. Furthermore, crystalline zinc oxide particles produced by laser pyrolysis generally have a high degree of crystallinity and few surface distortions.

Although under certain conditions mixed phase material may be formed, laser pyrolysis generally can be effectively used to produce single phase crystalline particles. Primary particles generally consist of single crystals of the material. The single phase, single crystal properties of the particles can be used advantageously along with the uniformity and narrow size distribution. Under certain conditions, amorphous particles may be formed by laser pyrolysis. Some amorphous particles can be heat treated under mild conditions to form crystalline particles.

Zinc oxides can have a stoichiometry of, at least, ZnO (hexagonal crystal, Zincite structure) or $ZnO_2$. The production parameters can be varied to select for a particular stoichiometry of zinc oxide.

C. Phosphors, Displays and Resistors

The particles described in this application can be used as phosphors. The phosphors emit light, preferably visible light, following excitation. A variety of ways can be used to excite the phosphors, and particular phosphors may be responsive to one or more of the excitation approaches. Particular types of luminescence include cathodoluminescence, photoluminescence and electroluminescence which, respectively, involve excitation by electrons, light and electric fields. Many materials that are suitable as cathodoluminescence phosphors are also suitable as electroluminescence phosphors.

In particular, the particles preferably are suitable for low-velocity electron excitation, with electrons accelerated with potentials below 1 KV, and more preferably below 100 V. The small size of the particles makes them suitable for low velocity electron excitation. Furthermore, preferred particles with average diameters less than about 100 nm can produce high luminescence with low electron velocity excitation. The phosphor particles can be used to produce any of a variety of display devices based on low velocity electrons, high velocity electrons, or electric fields.

Figure 10:
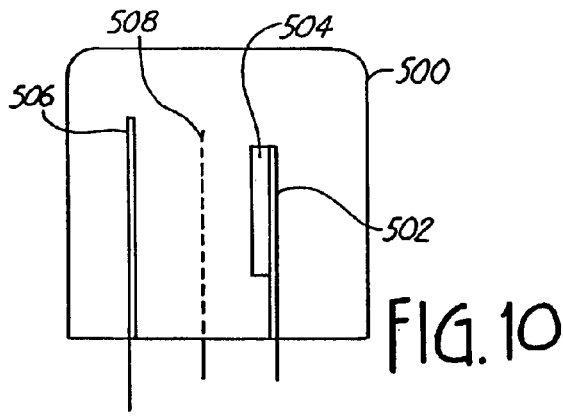
FIG. 10 is a sectional view of an embodiment of a display device incorporating a phosphor layer.

Referring to FIG. 10, a display device 500 includes an anode 502 with a phosphor layer 504 on one side. The phosphor layer faces an appropriately shaped cathode 506, which is the source of electrons used to excite the phosphor. A grid cathode 508 can be placed between the anode 502 and the cathode 506 to control the flow of electrons from the cathode 506 to the anode 502.

Cathode ray tubes (CRTs) have been used for a long time for producing images. CRTs generally use relatively higher electron velocities. Phosphor particles, as described above, can still be used advantageously as a convenient way of supplying particles of different colors, reducing the phosphor layer thickness and decreasing the quantity of phosphor for a given luminosity. CRTs have the general structure as shown in FIG. 10, except that the anode and cathode are separated by a relatively larger distance and steering electrodes rather than a grid electrode generally are used to guide the electrons from the cathode to the anode.

Figure 11:
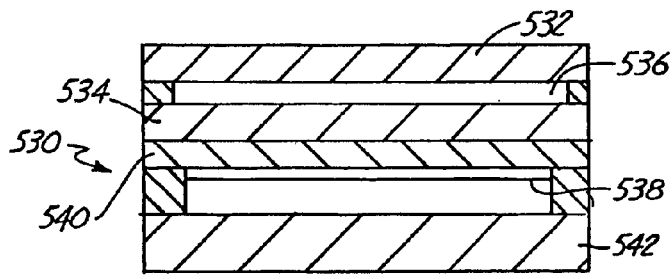
FIG. 11 is a sectional view of an embodiment of a liquid crystal display incorporating a phosphor for illumination.

Other preferred applications include the production of flat panel displays. Flat panel displays can be based on, for example, liquid crystals or field emission devices. Liquid crystal displays can be based on any of a variety of light sources. Phosphors can be useful in the production of lighting for liquid crystal displays. Referring to FIG. 11, a liquid crystal element 530 includes at least partially light transparent substrates 532, 534 surrounding a liquid crystal layer 536. Lighting is provided by a phosphor layer 538 on an anode 540. Cathode 542 provides a source of electrons to excite the phosphor layer 538. Alternative embodiments are described, for example, in U.S. Pat. No. 5,504,599, incorporated herein by reference.

Figure 12:
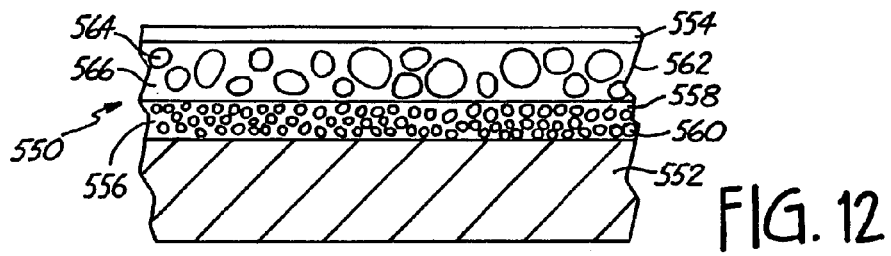
FIG. 12 is a sectional view of an electroluminescent display.

Liquid crystal displays can also be illuminated with backlighting from an electroluminescent display. Referring to FIG. 12, electroluminescent display 550 has a conductive substrate 552 that functions as a first electrode. Conductive substrate 552 can be made from, for example, aluminum, graphite or the like. A second electrode 554 is transparent and can be formed from, for example, indium tin oxide. A dielectric layer 556 may be located between electrodes 552, 554, adjacent to first electrode 552. Dielectric layer 556 includes a dielectric binder 558 such as cyanoethyl cellulose or cyanoethyl starch. Dielectric layer 556 can also include ferroelectric material 560 such as barium titanate. Dielectric layer 556 may not be needed for dc-driven (in contrast with ac-driven) electro-luminescent devices. A phosphor layer 562 is located between transparent electrode 554 and dielectric layer 556. Phosphor layer 562 includes electro-luminescent particles 564, such as zinc oxide nanoparticles, in a dielectric binder 566. The relative sizes of the materials are not necessarily to scale.

Electroluminescent display 550 also can be used for other display applications such as automotive dashboard and control switch illumination. In addition, a combined liquid crystal/electroluminescent display has been designed. See, Fuh, et al., Japan J. Applied Phys. 33:L870-L872 (1994), incorporated herein by reference.

Figure 13:
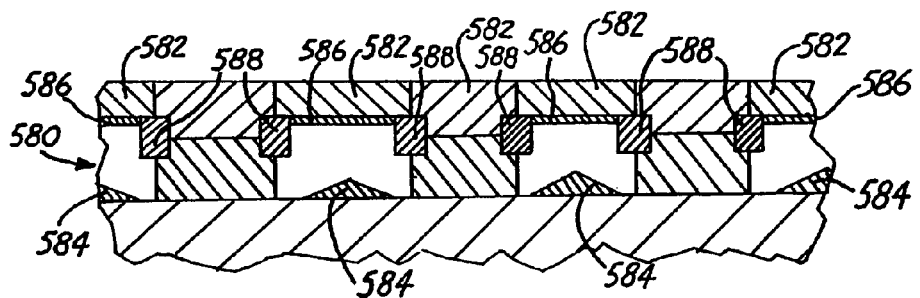
FIG. 13 is a sectional view of an embodiment of a flat panel display incorporating field emission display devices.

Referring to FIG. 13, a display 580 based on field emission devices involves anodes 582 and cathodes 584 spaced a relatively small distance apart. Each electrode pair form an individually addressable pixel. A phosphor layer 586 is located between each anode 582 and cathode 584. The phosphor layer 586 includes phosphorescent nanoparticles as described above. Phosphorescent particles with a selected emission frequency can be located at a particular addressable location. The phosphor layer 586 is excited by low velocity electrons travelling from the cathode 584 to the anode 582. Grid electrodes 588 can be used to accelerate and focus the electron beam as well as act as an on/off switch for electrons directed at the phosphor layer 586. An electrically insulating layer is located between anodes 582 and grid electrodes 588. The elements are generally produced by photolithography or a comparable techniques such as sputtering and chemical vapor deposition for the production of integrated circuits. As shown in FIG. 13, anodes 582 should be at least partially transparent to permit transmission of light emitted by phosphor 586.

Alternatively, U.S. Pat. No. 5,651,712, incorporated herein by reference, discloses a display incorporating field emission devices having a phosphor layer oriented with an edge (rather than a face) along the desired direction for light propagation. The construction displayed in this patent incorporates color filters to produce a desired color emission rather than using phosphors that emit at desired frequencies. Based on the particles described above, selected phosphor particles preferably would be used to produce the different colors of light, thereby eliminating the need for color filters.

The nanoparticles can be directly applied to a substrate to produce the above structures. Alternatively, the nanoparticles can be mixed with a binder such as a curable polymer for application to a substrate. The composition involving the curable binder and the phosphor nanoparticles can be applied to a substrate by photolithography or other suitable technique for patterning a substrate such as used in the formation of integrated circuit boards. Once the composition is deposited at a suitable positions on the substrate, the material can be exposed to suitable conditions to cure the polymer. The polymer can be curable by electron beam radiation, UV radiation or other suitable techniques.

Figure 14:
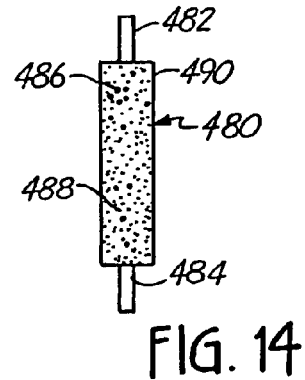
FIG. 14 is a schematic, sectional view of a resistor device taken through the center of the device.

Zinc oxide particles can also be used in the production of electrical components, such as resistors. A cross section of a resistor is shown schematically in FIG. 14. Resistor 480 include metal leads 482, 484. Zinc oxide nanoparticles 486 are embedded within a composite 488. The composite can include additional metal oxide particles and/or silicon carbide particles. Resistor 480 includes an electrically insulating cover 490.

In particular, zinc oxide powders can be uses for the production of varisters, which have a resistance that varies with applied voltage. The resistance material can further include various additional additives, such as $Bi_2O_3$, $Sb_2O_3$, $SiO_2$, $CO_2O_3$, $MnO_2$, other metal oxides and SiC. The various materials are combined with a binder. The resulting material can be calcined. Appropriate leads and insulating coatings can be attached to the structure to form an electrical component. The formation of varistors is described further in U.S. Pat. No. 5,250,281 to Imai et al, incorporated herein by reference.

The phosphor particles can be adapted for use in a variety of other devices beyond the representative embodiments specifically described.

EXAMPLE

The synthesis of zinc oxide particles described in this example was performed by laser pyrolysis. The particles were produced using essentially the laser pyrolysis apparatus of FIG. 2, described above, using the reactant delivery apparatus of FIG. 4.

The zinc nitrate.$6H_2O$ (Aldrich Chemical Co., Milwaukee, Wis.) precursor was carried into the reaction chamber as an aerosol of a 4M aqueous zinc nitrate solution made with deionized water. $C_2H_4$ gas was used as a laser absorbing gas, molecular oxygen was used as an oxygen source, and Argon was used as an inert gas. The Ar, $O_2$ and $C_2H_4$ were supplied as carrier gases in the apparatus of FIG. 4. The reactant mixture containing $Zn(NO_3)_2$, Ar, $H_2O$, $O_2$ and $C_2H_4$ was introduced into the reactant nozzle for injection into the reaction chamber. The reactant nozzle had an opening with dimensions of ⅝ in.×¼ in. Additional parameters of the laser pyrolysis synthesis relating to the particles of the Example are specified in Table 1.

TABLE 1

| | |
|---|---|
| Crystalline Phase | Zinc Oxide (ZnO) + unidentified |
| Crystal Structure | Zincite |
| Pressure (Torr) | 450 |
| Argon F.R.-Window (SLM) | 2.24 |
| Argon F.R.-Shielding (SLM) | 9.86 |
| Ethylene (SLM) | 1.42 |
| Argon (SLM) | 8.35 |
| Oxygen (SLM) | 1.71 |
| Laser Input (Watts) | 970 |
| Laser Output (Watts) | 770 |
| Precursor | Zinc Nitrate solution in water |
| Precursor Molarity | 4 M |
| Precursor Temperature ° C. | Room Temperature | slm = standard liters per minute
Argon - Win. = argon flow through inlets 216, 218
Argon - Sld. = argon flow through annular channel 142.

Figure 15:
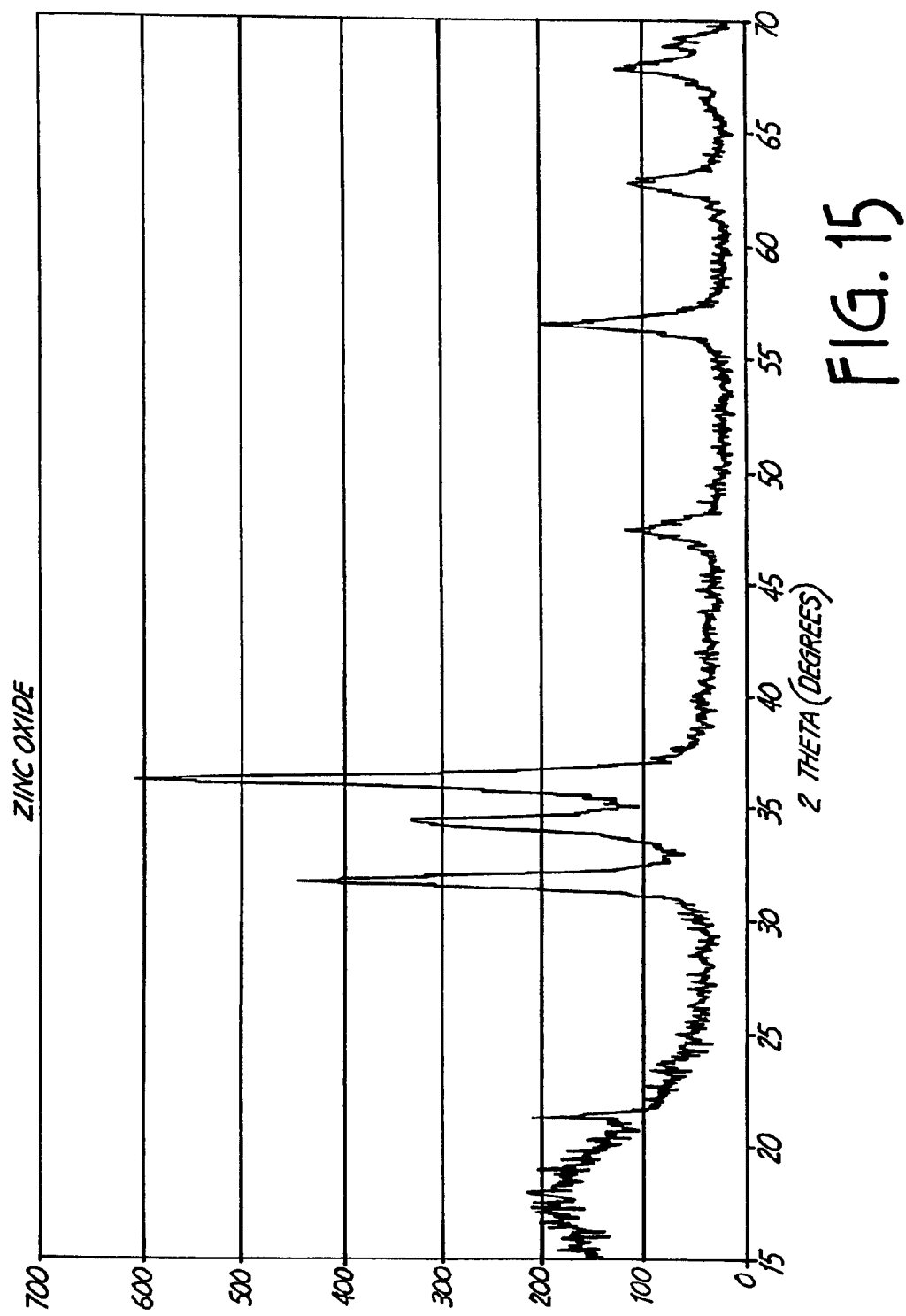
FIG. 15 is an x-ray diffractogram of zinc oxide nanoparticles produced by laser pyrolysis.

The production rate of zinc oxide particles was about 3 g/hr. To evaluate the atomic arrangement, the samples were examined by x-ray diffraction using the Cu(Kα) radiation line on a Siemens D500 x-ray diffractometer. X-ray diffractograms for a sample produced under the conditions specified in Table 1 is shown in FIG. 15. The particles had an x-ray diffractogram corresponding to zinc oxide, ZnO. The sharp peak in the diffractogram at a value of 2θ equal to about 22° was unidentified, indicating that another crystalline phase was present in the sample. Also, a broad peak centered at a value of 2θ equal to about 18° indicates the presence of an unidentified amorphous phase, possibly amorphous zinc oxide. Thus, three phases of materials evidently were present in the product powders.

An elemental analysis of the product powders yielded 71.55 percent by weight zinc and minor contaminants of 1.68 percent carbon, 0.2 percent nitrogen and 0.08 percent hydrogen. The particles had a gray color presumably due to the presence of the carbon. Assuming that the remaining weight is oxygen, the material is somewhat rich in oxygen relative to ZnO. Previously unknown phases of zinc oxide may be present. The carbon contamination can be removed by heating under mild conditions in an oxygen atmosphere. The removal of carbon contaminants from metal oxide nanoparticles is described further in copending and commonly assigned U.S. patent application Ser. No. 09/136,483 to Kumar et al., entitled "Aluminum Oxide Particles," incorporated herein by reference.

Based on these results, the reaction conditions can be varied empirically to obtain single phase crystalline ZnO by varying the parameters, such as reactant flow rates, pressure and laser power/temperature, to locate the conditions for the production of single phase zinc oxide. Since significant quantities of crystalline ZnO were produced under the conditions presented in Table 1, parameters suitable for production of the single phase material will be similar to these parameters.

Figure 17:
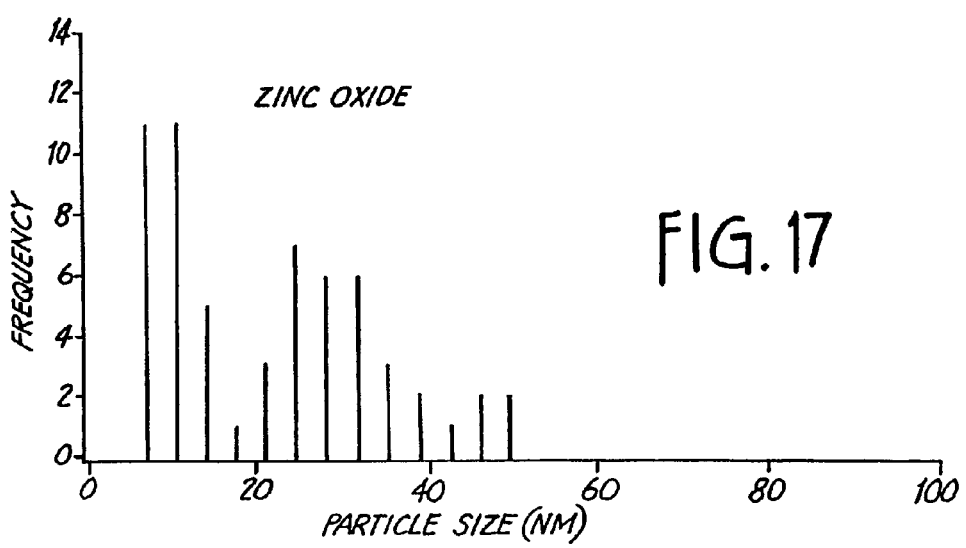
FIG. 17 is a plot of the distribution of primary particle diameters for the nanoparticles shown in the TEM micrograph of FIG. 16.
Figure 16:
FIG. 16 is a TEM micrograph of nanoparticles whose x-ray diffractogram is shown of FIG. 15.

Transmission electron microscopy (TEM) was used to determine particle sizes and morphology. A TEM micrograph for the particles produced under the conditions of Table 1 is displayed in FIG. 16. The corresponding particle size distribution is shown in FIG. 17. The approximate size distribution was determined by manually measuring diameters of the particles distinctly visible in the micrograph of FIG. 16. Only those particles having clear particle boundaries were measured to avoid regions distorted or out of focus in the micrograph. Measurements so obtained should be more accurate and are not biased since a single view cannot show a clear view of all particles. The particle size distribution shown in FIG. 17 has a bimodal or trimodal distribution indicative of multiple phases of materials. As noted above, different phases of materials form different size particles. If the laser pyrolysis is performed under conditions selected to yield a single phase of product particles, a narrow size distribution should result for particles of the particular phase. In particular, the resulting single phase crystalline ZnO would have an extremely narrow particle size distribution corresponding roughly to one of the three peak widths from FIG. 17.

The embodiments described above are intended to be illustrative and not limiting. Additional embodiments are within the claims below. Although the present invention has been described with reference to preferred embodiments, workers skilled in the art will recognize that changes may be made in form and detail without departing from the spirit and scope of the invention.

What is claimed is:

1. A collection of particles in a powder comprising crystalline zinc oxide, the collection of particles having an average diameter less than about 95 nm and a distribution of particle sizes such that at least 95 percent of the particles have a diameter greater than about 40 percent of the average diameter and less than about 160 percent of the average diameter.

2. The collection of particles of claim 1 wherein the collection of particles have an average diameter less than about 45 nm.

3. The collection of particles of claim 1, wherein the collection of particles have an average diameter from about 5 nm to about 25 nm.

4. The collection of particles of claim 1 wherein effectively no particles have a diameter greater than about four times the average diameter of the collection of particles.

5. The collection of particles of claim 1 wherein effectively no particles have a diameter greater than about three times the average diameter of the collection of particles.

6. An electrical resistor component comprising the collection of particle of claim 1.

7. The electrical resistor component of claim 6 wherein the component is a varister.

8. The electrical resistor component of claim 7 wherein the varister has a non-linear voltage dependence.

9. The electrical resistor component of claim 6 further comprising metal/silicon oxide particles selected from the group consisting of $Bi_2O_3$, $Sb_2O_3$, $SiO_2$, $Co_2O_3$, and $MnO_2$.

10. The collection of particles of claim 1 wherein effectively no particles have a diameter greater than about two times the average diameter of the collection of particles.

11. The collection of particles of claim 1 wherein at least 95 percent of the particles have ratios of the dimension along the major axis to the dimension along the minor axis less than about 2.

12. The collection of particles of claim 1 wherein the zinc oxide has a stoichiometry of ZnO.

13. The collection of particles of claim 1 wherein the zinc oxide has a stoichiometry of $ZnO_2$.

14. The collection of particles of claim 1 wherein the zinc oxide has a Zincite crystal structure.

* * * * *